United States Patent [19]

Bemisderfer

[11] Patent Number: 5,056,586

[45] Date of Patent: Oct. 15, 1991

[54] VORTEX JET IMPINGEMENT HEAT EXCHANGER

[75] Inventor: Charles H. Bemisderfer, Granger, Ind.

[73] Assignee: Modine Heat Transfer, Inc., Racine, Wis.

[21] Appl. No.: 540,019

[22] Filed: Jun. 18, 1990

[51] Int. Cl.$^5$ ............................................. F28F 13/12
[52] U.S. Cl. ..................................... 165/1; 165/109.1; 165/908; 165/181
[58] Field of Search ...................... 165/109.1, 181, 908, 165/1

[56] References Cited

U.S. PATENT DOCUMENTS

| | | | |
|---|---|---|---|
| 2,042,610 | 6/1936 | Littleton | 165/908 X |
| 2,474,467 | 6/1949 | Conley | 165/122 |
| 3,199,212 | 8/1965 | Fouse | 165/908 X |
| 3,450,199 | 6/1969 | Warrell | 165/908 X |
| 3,741,285 | 6/1973 | Kuethe | 165/1 |
| 3,804,159 | 4/1974 | Searight et al. | 165/109.1 |
| 3,844,343 | 10/1974 | Burggraf | 165/109.1 |
| 4,494,171 | 1/1985 | Bland et al. | 361/386 |
| 4,573,865 | 3/1986 | Hsia et al. | 415/115 |
| 4,775,007 | 10/1988 | Sakuma et al. | 165/151 |
| 4,815,531 | 3/1989 | Presz, Jr. et al. | 165/151 |

FOREIGN PATENT DOCUMENTS 754800 10/1970 Belgium ............................. 165/908

OTHER PUBLICATIONS

An article, titled "Vortex Generating Flow Passage Design for Increased Film-Cooling Effectiveness and Surface Coverage"; by S. Stephen Papell, written for the ASME Journal.

Primary Examiner—Allen J. Flanigan
Attorney, Agent, or Firm—Wood, Phillips, Mason, Recktenwald & VanSanten

[57] ABSTRACT

A heat exchanger is provided with a plurality of fins connected in thermal communication with a tube. The tube is shaped to conduct the flow of the first fluid and the fins are arranged to be disposed within a stream of flow of a second fluid. The fins are provided with a plurality of holes, or perforations, through which the second fluid is directed to flow. The holes through the fins are generally oblong in shape, being somewhat elliptical. The oblong hole has two generally semicircular ends and two connecting long sides, wherein one of the long sides is generally flat and the other long side is provided with a cusp surface which divides the oblong hole into two generally equal portions. The relative position of the cusp surface to the long surface creates counter rotating vortices in the flow of fluid as it passes through the hole. These counter rotating vortex pairs wipe the surface of an adjacent fin when the flow is directed to impinge against a non-perforated portion of that adjacent fin. This wiping action improves the thermal efficiency of the heat exchanger by more effectively increasing the convective heat transfer coefficient on the surface of the fin which is struck by the flow of fluid passing through the oblong hole with the cusp long surface.

19 Claims, 7 Drawing Sheets

VORTEX JET IMPINGEMENT HEAT EXCHANGER

BACKGROUND OF THE INVENTION

1. Field of the Invention

The present invention is related generally to heat exchangers and, more particularly, to heat exchangers which incorporate fin and tube or plate and tube arrangements. Even more specifically, the present invention is related to the use of jet impingement holes through the fins or plates of the heat exchanger and, most particularly, to the use of these jet impingement holes which are shaped in the form of an oblong, or oval, with a cusp surface which creates a vortex-type flow of fluid as the fluid passes through the holes of the fins.

2. Description of the Prior Art

Those skilled in the art have been aware of tube and fin heat exchangers for many years. In addition, those skilled artisans are also generally familiar with the concept of impingement cooling devices. Furthermore, certain cooling applications have utilized vortex generating flow passages for the purposes of increasing film-cooling effectiveness and surface coverage.

U.S. Pat. No. 3,844,343, which issued to Burggraf on Oct. 29, 1974, discloses an impingement cooling system that incorporates a heated plate which is cooled by a cooling fluid impinging thereon. The cooling fluid flows from a plenum that is partially defined by a second plate spaced away from the first plate. Apertures in the latter plate provide communication between the plenum and the cooled plates. For the purpose of increasing cool fluid heat transfer of the impinging jets, each of the apertures is provided with a varied diameter along its length, the smallest diameter extending over a given portion of the aperture length to form a throat portion. The aperture cross section between the throat and the maximum diameter may be of any convenient configuration, such as conical or counterbored.

U.S. Pat. No. 2,474,467, which issued to Conley on June 28, 1949, describes a heating apparatus wherein a source of heat is placed at the bottom of the unit and the air immediately above the unit of heat is heated within an enlarged heat transfer chamber. Transverse passageways of the chamber are provided whereby heat is transferred to air current circulating throughout the room or other area which the apparatus is intended to heat. Such passageways are provided in the form of Venturi ducts with lateral wing areas which not only cause the heated gasses from the source of heat to follow a tortuous passageway to the flue or chimney into which such gasses are discharged, but also causes a spiral jet action on the air within the chamber.

U.S. Pat. No. 3,741,285, which issued to Kuethe on June 26, 1973, describes a boundary layer control of flow separation and heat exchange. The purpose of this invention is to provide boundary layer control for the delay or prevention of flow separation and to increase the rate of heat exchange between the surface and fluid by an arrangement of surface elements which may take the form of either crests or discrete concave depressions in the surface. These depressions have effective depth or dimensions of less than that of the adjacent boundary layer thickness for the purpose of causing the formation of vortices with succeeded surface elements being positioned to cause vortex amplification. This creates effective boundary layer mixing with less drag, weight penalty, noise and energy loss than conventional vane type generators.

U.S. Pat. No. 4,494,171, which issued to Bland et al on Jan. 15, 1985, describes an impingement cooling apparatus for a heat liberating device or cold plate. It relates to an impingement cooling apparatus for use in the removal of heat from a heat liberating device, such as an electronic component. The apparatus includes a housing on which the device is secured and a stack of plates fitted within the housing. One of the plates is an impingement orifice plate adjacent the housing where the device is located. The orifice plate has a region that is characterized by coolant flow impingement orifices passing therethrough. The orifice plate also has a coolant drainage return adjacent the impingement orifice region.

U.S. Pat. No. 4,573,865, which issued to Hsia et al on Mar. 4, 1986, discloses a multiple impingement cooled structure. This patent describes a structure, such as for use as a turbine shroud assembly. It includes a plurality of baffles which define with an element to be cooled, such as a shroud, a plurality of cavities. Impingement cooling air is directed through holes in one of the baffles to impinge upon only the portion of the shroud in the first cavity. That cooling air is directed to impinge again upon the portion of the shroud in a second cavity.

U.S. Pat. No. 3,804,159, which issued to Searight et al on Apr. 16, 1974, describes a jet impingement fin coil. It discusses and illustrates a heat exchanger in the form of a finned tube configuration for transferring heat between the contents of the tube and the atmosphere surrounding the finned tube. The fins extend outwardly from the tube and are attached to the tube in heat conducting relationship. The fins are perforated in a predetermined pattern to provide openings through which the outside atmosphere is directed as jets upon portions of the fins in such a fashion as to disrupt boundary layers normally existing adjacent the surfaces upon which the jets impinge.

An article, titled "Vortex Generating Flow Passage Design For Increased Film-Cooling Effectiveness and Surface Coverage", by S. Stephen Papell of the National Aeronautics and Space Administration, Louis Research Center, was written for the ASME Journal. It describes the use of flow passages which have a cross section shaped in the form of an oval with two long sides in which one of the long sides is generally flat and the other long side is provided with a cusp surface. This shape induces counter rotating vortex pairs in the flow passing through the passage. This particular paper was written in relation to experiments conducted to examine the fluid mechanics of the basic discreet whole film cooling process described in the paper as an inclined jet in crossflow. The paper hypothesizes a cusp-shaped coolant flow channel contour that increases the efficiency of the film cooling process. The paper examines the interaction of the vortex structures generated by both geometry and crossflow in terms of film cooling effectiveness and surface coverage. Film cooling is a method for protecting turbine blades and vanes in high performance engines for advanced aircraft. The coolant itself is drawn from a compressor that is part of the aerodynamic cycle of the engine. The coolant enters the blade base to access the internal passages in the blade and is ejected through holes drilled at some angle through the blade walls into a flowing hot gas boundary layer along the outside surface of the blade. The injected coolant is trapped in the boundary layer and insulates the blade from the hot gases.

While those skilled in the art of heat exchange devices have utilized tube and fin heat exchangers to conduct heat from one fluid to another and, in addition, have utilized jet impingement techniques to transmit heat from a surface to a fluid, none of the prior art shows the combination of jet impingement techniques with plate and tube or fin and tube heat exchangers wherein the passages through the plates or fins of the heat exchanger are shaped to provide a cusp surface for the purpose of inducing counter rotating vortices in the fluid passing through the openings.

SUMMARY OF THE INVENTION

The concept of using jet impingement in conjunction with fin and tube heat exchangers is generally known to those skilled in the art. One specific example of this concept is described and illustrated in U.S. Pat. No. 3,804,159, which issued to Searight et al on Apr. 16, 1974. The Searight et al patent clearly describes the advantages of jet impingement used in conjunction with a fin and tube heat exchanger. The fluid is caused to flow through the small perforations in the fins. The perforations are arranged in relation to non-perforated surfaces of other fins in such a way that the fluid passing through the perforations strikes the non-perforated portions of the other fins with an increased velocity that, to some degree, disrupts the boundary layer that normally would exist proximate the heat exchanging surface of the fins. This boundary layer, if permitted to remain in place, provides a degree of insulation which decreases the effectiveness of the heat exchanger structure. By directing the jets of fluid that pass through the perforations in the fins toward these non-perforated surfaces having boundary layers for the purpose of disrupting those boundary layers, the efficiency of the heat exchanger is improved.

The present invention is directed toward an improvement that goes significantly beyond the improvement described in the Searight et al patent. Instead of merely permitting the air to flow through the perforations and strike the boundary layer adjacent the non-perforated surface of adjacent fins, the present invention causes that air to flow in counter rotating vortices as it exits the perforation and continues its flow toward the non-perforated surfaces of adjacent fins. This counter rotating vortical pattern of flow increases the wiping effect of the fluid as it strikes the non-perforated surface of the fin upon which it impinges. This, in turn, introduces larger turbulence into the boundary layer and also increases the convective heat transfer at the impinging surface.

A preferred embodiment of the present invention provides a heat exchanger that comprises a tube that is shaped to contain and direct the flow of a first fluid. It also comprises a plurality of fins attached in thermal communication with the tube, wherein each of the fins has a plurality of holes or perforations extending through the thickness of the fins. A preferred embodiment of the present invention also provides a means for causing a substantial portion of a second fluid to pass through the holes or perforations and, in addition, a means for directing the second fluid against a predetermined target surface of one of the fins after passing through the hole in an adjacent fin. Each of the holes or perforations is generally oblong in shape being somewhat elliptical with two generally semicircular ends and two long generally straight connecting sides. A first one of the long sides is generally flat while a second one of the long sides has a cusp surface. The cusp surface partially divides the oblong shaped opening into two segments. Each of these segments creates a vortical flow in a fluid passing through the opening. Because of the relative position of the cusp to the openings, the two openings within the oblong shaped perforation combine to create two vortical flows which rotate in opposite directions. Thus, the cusp shaped surface of the generally oblong hole causes flow to form as counter rotating vortices when it passes through the opening.

BRIEF DESCRIPTION OF THE DRAWING

The present invention will be more fully understood from a reading of the description of the preferred embodiment in conjunction with the drawing, in which.

DESCRIPTION OF THE PREFERRED EMBODIMENT

Figure 1:
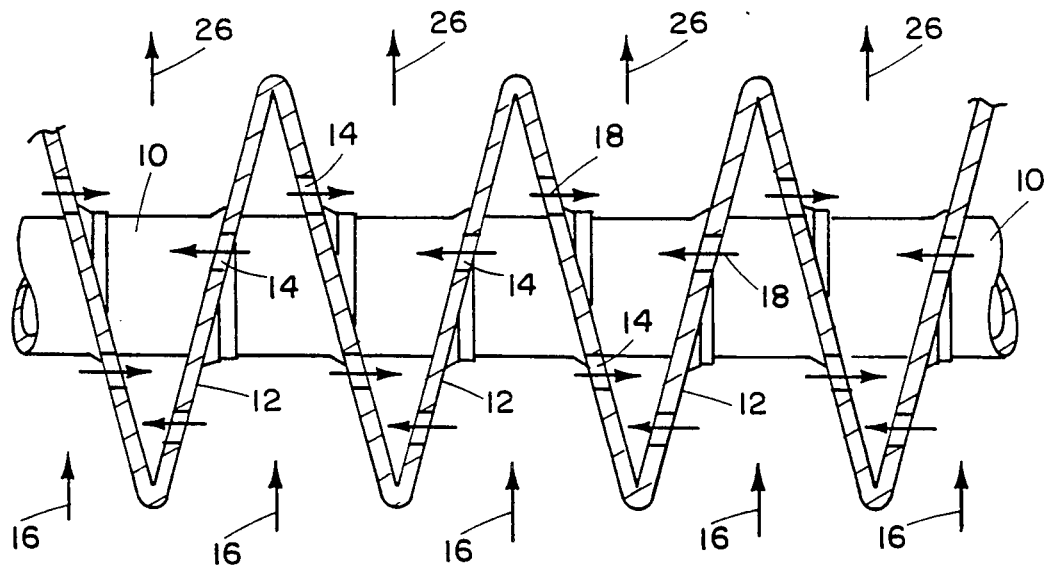
FIG. 1 illustrates a tube and fin heat exchanger wherein the fin is shaped in a manner to form flow directing surfaces at both the trailing and leading edges of the heat exchanger fin segments.

Throughout the description of the preferred embodiment, like elements will be identified by like reference numerals. All of the United States Patents described above are expressly incorporated by reference in this application.

FIG. 1 shows a tube and fin heat exchanger structure generally similar to those known to skilled artisans and illustrated in U.S. Pat. No. 3,804,159. It comprises a tube 10 and a plurality of fin segments 12 which are connected together to form the convolutions shown in FIG. 1. The fin arrangement can be formed by joining a plurality of fin segments 12 together or, alternatively, by providing a convoluted single piece fin assembly. An important characteristic of this fin assembly is that it effectively directs flow through openings 14, or perforations, formed through the surface of the fin segments. As air passes toward the fin arrangement, as illustrated by arrows 16, the connections between the fin segments 12 prevent a substantial portion of the air, or alternative fluid, from passing directly through the structure without passing through the openings 14. The passage of the fluid through the openings is illustrated by arrows 18. After passing through the openings 14, as indicated by arrows 18, the fluid continues its passage away from the tube 10 in the direction indicated by arrows 26.

As can be seen in FIG. 1, the air passing through the openings 14 continues to flow in a direction toward an adjacent fin and strikes the adjacent fin at a target area that is non-perforated. This striking of the adjacent fin by the stream of fluid exiting from an opening 14 disrupts any boundary layer that may have formed on the surface of the fin segments 12 and wipes the adjacent fin with high velocity fluid. This boundary layer disruption and wiping action improves the convective heat transfer between the fins and the fluid passing in the directions indicated by the arrows in FIG. 1. This wiping action also provides more intimate contact between the molecules of the air, or alternative fluid, and the surface of the fin proximate the target area.

Figure 2:
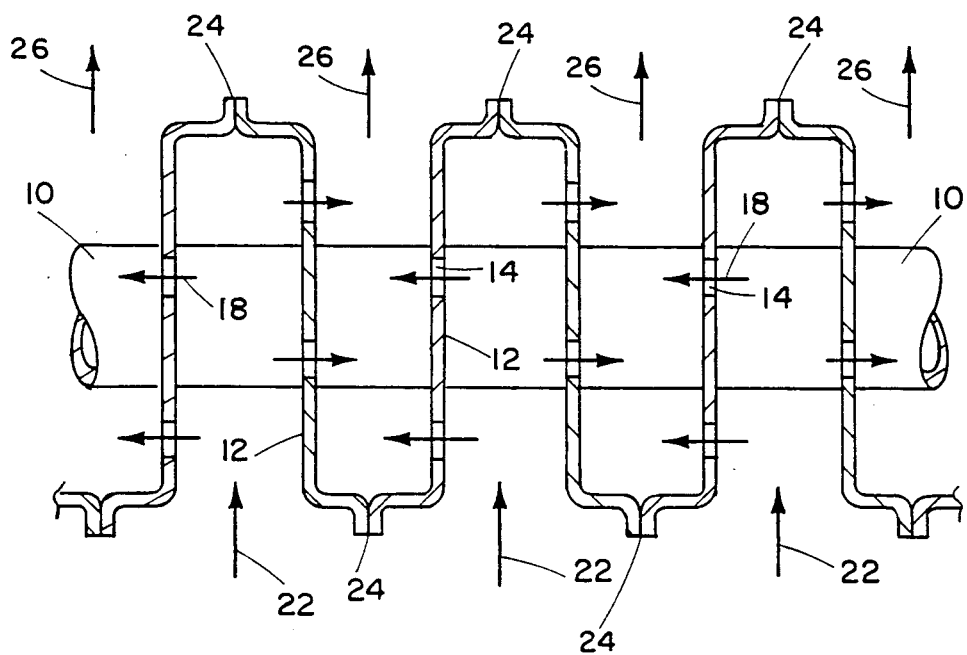
FIG. 2 shows a tube and fin heat exchanger with adjacent fins being connected together to form flow directing passages while permitting the fins to be generally parallel to each other and perpendicular to the centerline of an attached tube.

FIG. 2 shows an alternative type of fin and tube heat exchanger which is also made in general conformance with the techniques described above in conjunction with FIG. 1. The device shown in FIG. 2 is known to those skilled in the art and is also generally similar to that illustrated in U.S. Pat. No. 3,804,159. Air passes towards the heat exchanger structure in a direction indicated by arrows 22. Because of the association of adjacent fin segments 12 connected together at joints 24, the air is not permitted to flow directly through the structure but, instead, is forced to flow through openings 14 which are formed in the fin segments 12. This association of adjacent fin segments 12 operates to provide a means for causing a substantial portion of the fluid to pass through the holes 14. As will be discussed below, the present invention also utilizes this concept. This flow through the openings 14 is indicated by arrows 18. After passing through openings 14, the streams of air are directed toward non-perforated portions of the fin segments 12 which are directly opposite the perforations 14 in adjacent fins. When the fluid strikes the non-perforated portions of the fin segments 12, the fluid disrupts boundary layers that may form on the surfaces of the fin segments and also wipes the fin segments with high velocity fluid. This boundary layer and wiping action disruption improves the convective heat transfer and, therefore, the thermal efficiency of the heat exchanger.

After passing through openings 14 and striking opposite sections of adjacent fins, the air continues to move away from the heat exchanger structure as indicated by arrows 26. Therefore, it should be apparent that both FIGS. 1 and 2 illustrate the basic use of jet impingement to improve the convective heat transfer between fin segments 12 and air or alternative fluids passing in thermal communication with those fin segments. Furthermore, it should be understood that both illustrations described in conjunction with FIGS. 1 and 2 are related to tube and fin heat exchangers which conduct a fluid through a tube 10 and exchange heat between that fluid and the walls of the tube 10. In addition, heat is conducted from the tube wall to the fin segments 12 and, eventually, from the surfaces of the fin segments 12 to a fluid passing in thermal communication with the fin segments. The use of jet impingement improves the efficiency of the convective heat transfer between the surfaces of the fin segments and the air or other fluid passing in thermal communication with those surfaces, as illustrated by the arrows in FIGS. 1 and 2.

Figure 3:
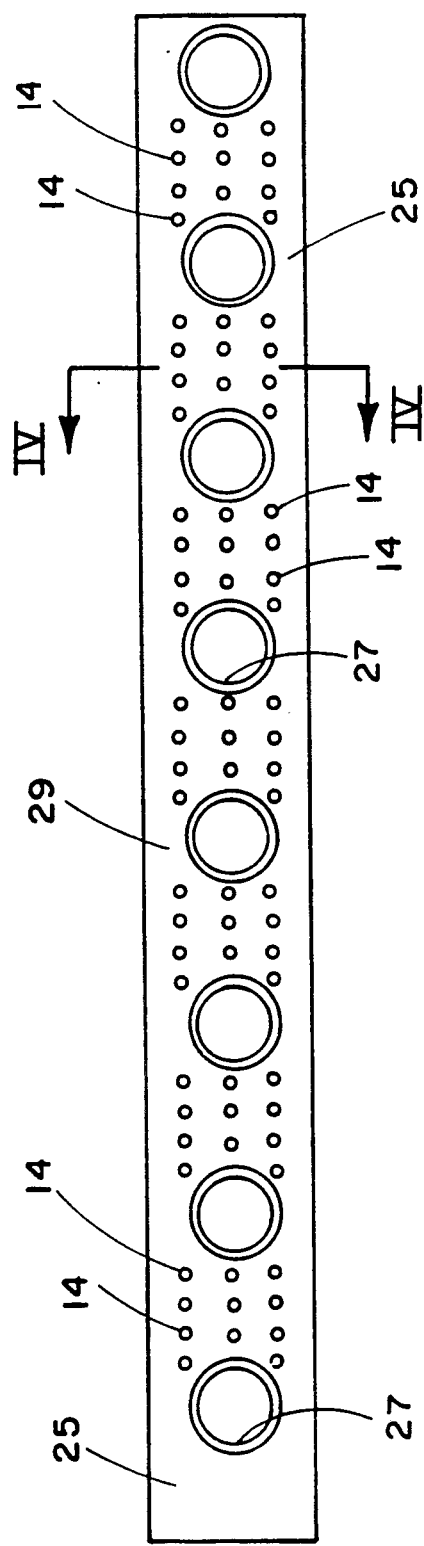
FIG. 3 illustrates a typical fin with which the present invention can be incorporated.

FIG. 3 illustrates a typical fin for use in a tube and fin heat exchanger. The fin 25 is provided with a plurality of openings 27 that are shaped to receive fluid conducting tubes therein. The fin 25 is also provided with a plurality of holes 14 extending through the thickness of the fin. A tube and fin heat exchanger would comprise a plurality of fins 25 stacked in association with each other with their respective openings 27 aligned to receive tubes extending through the plurality of stacked fins 25.

Figure 4:
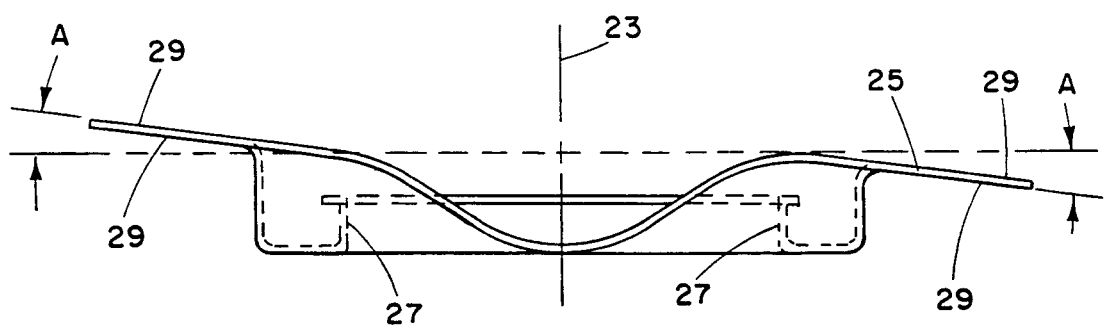
FIG. 4 is a section view of the fin illustrated in FIG. 3.

FIG. 4 illustrates a sectional view of the fin 25 shown in FIG. 3. As can be seen in FIG. 4, the fin is made in such a way that the planar surfaces 29 of the fin are disposed at an angle A relative to a line perpendicular to the central axis 23 of the generally cylindrical opening 27. The result of this angle A is that, when a plurality of fins 25 are assembled in association with one or more tubes extending through openings 27, the planar surfaces 29 of the fins 25 will be disposed at an angle that is not perpendicular to the central axis of the tube. In a preferred embodiment of the present invention, a plurality of similarly configured fins 25 are arranged in association with a plurality of tubes extending through openings 27 in an alternating manner which causes the distal ends of the planar surfaces 29 to be disposed in close proximity with the distal ends of planar surfaces of adjacent fins 25. If the fins 25 are alternated in assembly as described above, angle A causes this effect and provides a heat exchanger assembly generally similar to that shown in FIG. 1, wherein fin segments are in contact, or close proximity, at their distal ends. This arrangement provides the means for causing a substantial portion of a fluid to pass through the holes 14 rather than passing through the heat exchanger parallel to the planar surfaces 29 without passing through holes 14. It should be noted that, for purposes of simplifying the illustration of FIG. 4, holes 14 are not shown passing through the planar surfaces 29. However, it should be understood that a plurality of holes of this type extend through the thickness of the fin 25 generally perpendicular to the planer surfaces 29.

Figure 5:
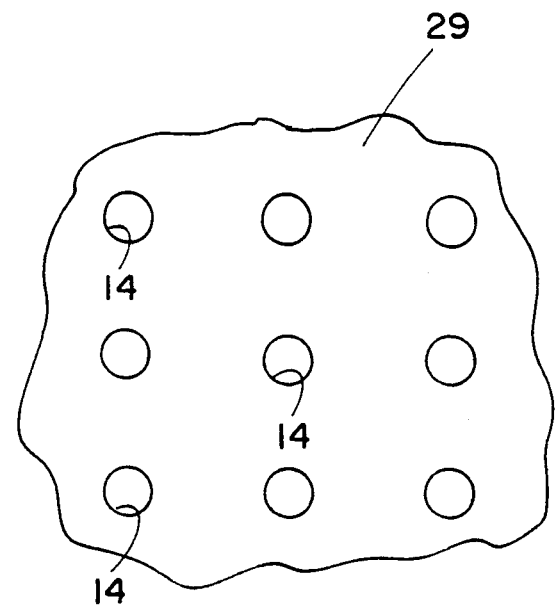
FIG. 5 shows a portion of the surface of the fin in FIG. 3 particularly showing a plurality of holes extending through the fins.

FIG. 5 shows an exemplary surface 29 of a fin, such as the fin 25 illustrated in FIG. 3, used in a tube and fin heat exchanger. As can be seen, the holes 14 are generally round and extend through the thickness of the fin surface 29. The holes 14 shown in FIG. 5 are typical of the holes illustrated in FIGS. 1 and 2 and also identified by reference numeral 14. These holes are generally punched through the surfaces of the heat exchanger fins prior to their assembly in association with the tubes 10.

Figure 6:
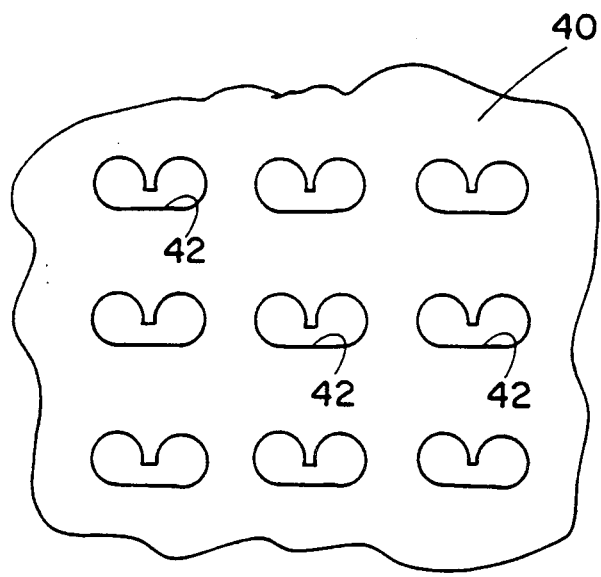
FIG. 6 shows what the holes of FIG. 5 would look like if made in accordance with the present invention.

FIG. 6 illustrates a fin surface which is identified by reference numeral 40. It should be understood that the fin surface 40 is generally similar in nature to the fin surface 29 described above. The hole, or perforation, shown in FIG. 6 is identified generally by reference numeral 42. As will be described in significantly greater detail below, the hole 42 is generally oblong in shape and has a cusp surface.

By comparing FIGS. 5 and 6, the significant distinction between the hole 42 of the present invention and the hole 14 of known perforated fin and tube heat exchangers can be seen. As will be described below, the specific shape of the hole 42 of the present invention is formed for the purpose of causing the air, or another fluid, flowing through the hole, to assume a particular type of flow pattern. More specifically, this improved flow pattern is intended to increase the efficiency of the heat exchanger by more effectively disrupting the boundary layer which may have formed on the surface of adjacent fins in non-perforated areas opposite the hole 42 and, more importantly, by more effectively wiping the target surface of the adjacent fin with an increased turbulence than that which could be achieved with a round hole. As a result of the formation of counter rotating vortices that are induced by the shape of the hole 42, the flow path of the air passing through hole 42 travels in a helical pattern that expands as it moves away from the hole 42. This results in a vortex that expands in diameter as it nears the target surface of an adjacent fin. This expanding vortex provides turbulent flow in a larger area of the target surface than would be possible if a round hole was used.

Figure 7:
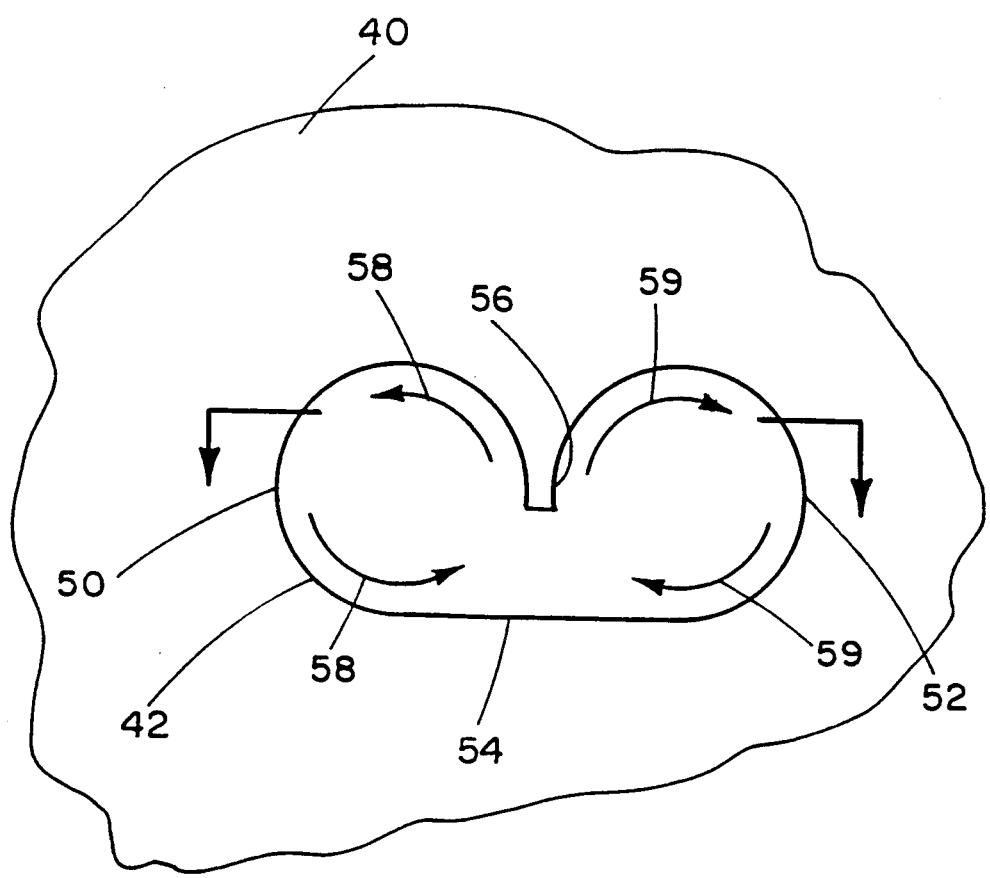
FIG. 7 shows an enlarged view of one of the holes of FIG. 6.

FIG. 7 illustrates an enlarged view of a hole 42 formed in a fin surface 40. As can be seen, the hole 42 is generally oblong in shape with a first generally semicircular end 50 and a second generally semicircular end 52. The generally oval, or oblong, hole 42 has two long sides. A first long side 54 is generally flat and extends between ends 50 and 52. The other long side is provided with a cusp surface. The cusp 56 is illustrated in FIG. 7 as extending downward away from the second long surface and toward the first long surface 54 of the oblong hole.

As a fluid flows through the hole 42, in a direction perpendicular to the surface 40 of the fin, the flow is divided into two major segments and each segment is caused to rotate as it passes through the fin. Arrows 58 illustrate the rotation of one of these segments as it flows through the left half of hole 42. As illustrated by arrows 58, this flow is in a generally counter-clockwise direction as viewed in FIG. 5. The right half of the hole 42 causes the other segment or flow to pass through the right portion of the hole and rotate in a direction, as indicated by arrows 59, which is generally clockwise as illustrated in FIG. 7. Therefore, it can be seen that the shape of the hole 42 with its cusp surface, causes the flow of fluid to form into two segments that combine to form counter rotating vortices.

Figure 8:
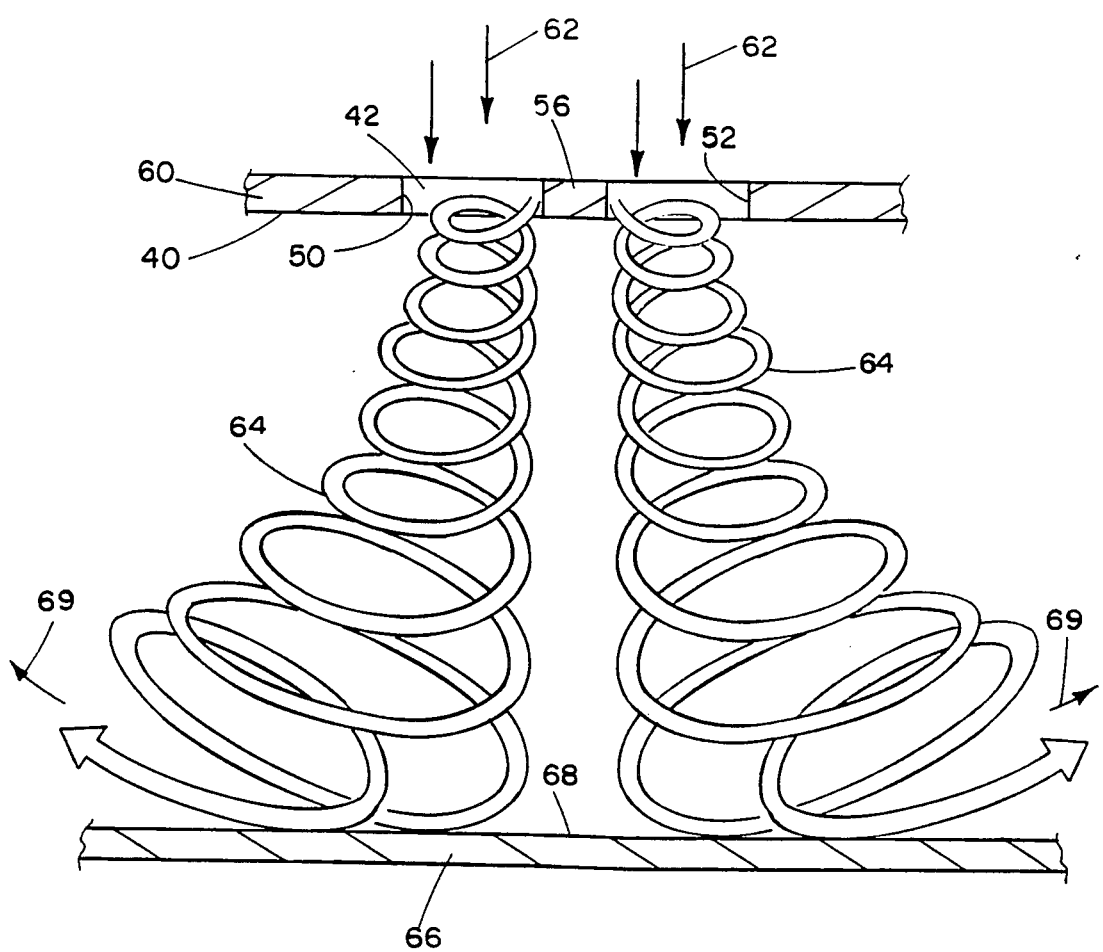
FIG. 8 is a sectional view of the enlarged hole of FIG. 7 with an additional target surface added for illustration.

FIG. 8 is a section view of the fin surface 40 illustrated in FIG. 7. The hole 42 is shown extending through the cross sectional view of a typical fin 60. The ends, 50 and 52 of the generally oblong hole 42 are also shown. In the central portion of the oblong hole 42, a sectional view of part of the cusp 56 is shown. As air, or an alternative fluid, flows toward the fin 60 as illustrated by arrows 62, it eventually passes through one of a plurality of openings such as opening 42 shown in FIG. 8. As the fluid passes through the thickness of the fin 60, the particular shape of the opening 42 causes the air to form two counter rotating vortices as described above. The direction of flow resulting from these counter rotating vortices follows a generally helical path as illustrated by arrows 64. As the stream of air, or another fluid, passes from one fin 60 toward the nonperforated surface of another fin 66, the stream strikes the surface 68 of fin 66 with a wiping action that is caused by the vortical flow and, as a result, disrupts the boundary layer proximate that surface. It should also be understood that the wiping action caused by the vortical flow improves the convective heat transfer between the fluid and the target surface 68 of the adjacent fin 66. It is very important to also note that the vortices disrupt the flow of the fluid between fins 60 and 66 even in circumstances that prevent the counter rotating vortices from actually impinging the surface 68 of fin 66. It is realized that in certain circumstances the region between adjacent fins may experience significant fluid flow in a direction generally parallel to the fins. This flow between the fins could be sufficient to divert the direction of travel of the counter rotating vortices and prevent them from extending completely across the space between adjacent fins. These circumstances would prevent the counter rotating vortices from actually impinging the surface 68 of the adjacent fin 66. However, even under these circumstances, the present invention improves the characteristics of a heat exchanger by effectively disrupting the flow in the area between adjacent fins and mixing the fluid flowing between those fins even if the counter rotating vortices never actually reach the opposite surface. This improved disruption of the fluid between the fins improves the mixing of the fluid and the removal of hot gas from the region proximate the surface 68 of the adjacent fin 66. Therefore, the present invention improves the thermal characteristics of a heat exchanger even under circumstances when the counter rotating vortices are unable to reach the target surface of an adjacent fin. It should also be noted that each of the two counter rotating vortices shown in FIG. 8 expands as it travels away from fin 60 toward fin 66. As each vortex expands during its travel toward surface 68, the effective area of the vortex is increased. As a result, each of the vortices creates a turbulence in an area of the target surface that is greater than would be achieved if the flow was not along a counter rotating vortical path. This increases the turbulence in an enlarged area of the target surface and, as a result, improves the convective heat transfer between the air, or alternative fluid, passing through the holes and the surface of the adjacent fin.

After striking the surface 68 of fin 66, the fluid continues its flow toward subsequent openings in other fins. This continued flow is illustrated by arrows 69. By examining FIG. 8 and, more particularly, the relationship between the flow indicated by arrow 64 and surface 68, it can be seen that the fluid passing through the hole 42 does not merely strike the opposite surface 68 in a perpendicular direction but, instead, strikes surface 68 with its flow passing in a direction which is not perpendicular to the surface. This direction or flow caused by the counter rotating vortices that are induced by the hole 42 creates an effective wiping action of the stream of fluid against the surface 68. This effective wiping action is more turbulent and, therefore, more disruptive of the boundary layer than a flow of fluid in a purely perpendicular direction against surface 68. By more effectively disrupting the boundary layer and by wiping the surface with more turbulent fluid, the convective heat transfer is increased and therefore the present invention improves the thermal efficiency of the heat exchanger.

Figure 9:
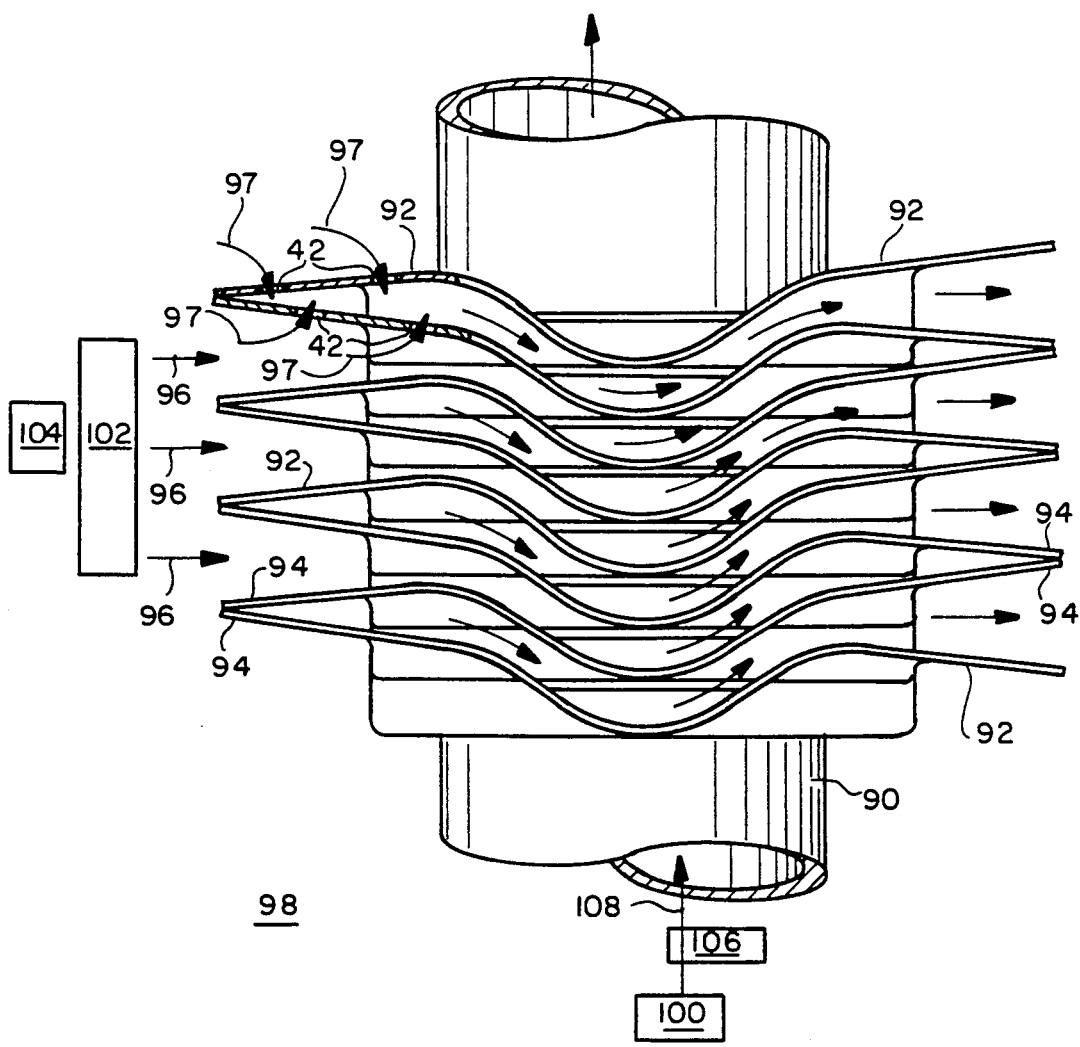
FIG. 9 shows a portion of a heat exchanger utilizing the fin of FIGS. 3 and 4.

FIG. 9 shows a preferred embodiment of the present invention utilized in a heat exchanger assembly. As can be seen in FIG. 9, a plurality of substantially parallel fins 92 are arranged in association with a plurality of tubes 90 (for purposes of this illustration, only one tube 90 is shown). The fins 92 are generally similar to the fin shown in FIG. 3 and FIG. 4 and described above. In the preferred embodiment, the holes 42 are a substantially coplanar with the fins 92 as seen in FIG. 9. Each of the fins 92 is shaped to provide an angle between a line which is perpendicular to the central axis of the tube 90. That angle, which operates in a manner similar to the angle A described in conjunction with FIG. 4, permits the fins to be alternated in such a way that distal ends 94 of the fins are proximate to each other or, in some cases, actually touching each other. The close proximity of the distal ends 94 of the fins 92 prevents a fluid from passing easily through the heat exchanger generally parallel to the surfaces of the fins. Instead, the proximity of the distal ends 94 directs air through the holes 42 in each of the fins. Therefore, a flow of fluid passing toward the heat exchanger, as indicated by arrows 96, is prevented from easily passing directly through the heat exchanger without passing through the holes 42. This provides a means for causing a substantial portion of the flow to pass through the holes 42. For purposes of simplicity, only a few holes 42 and arrows 97 are shown in FIG. 9. As the flow passes through the holes 42, as indicated by arrows 97, the shape of the holes 42 creates counter rotating vortices in the fluid as it continues its path toward a target surface of an adjacent fin segment. Although the arrows 97 in FIG. 9 do not specifically show the counter rotating vortices, it should be understood that the shape of the hole 42 creates this effect. Even in circumstances where a significant boundary layer is not formed, the counter rotating vortices of the present invention disrupt the fluid proximate the surface of the adjacent fin and, for the reasons described in detail above, improve the thermal characteristics of the heat exchanger. In addition, even if the counter rotating vortices do not actually impinge upon the opposite surface, the vortical flow disrupts the fluid flow between the fins and improves the mixing of the fluid.

As is readily appreciated by those skilled in the art, the preferred embodiment of FIG. 9 may be disposed within a furnace housing 98. Any source 100 of a first fluid known in the art may be used with the present invention. Similarly, any source 102 of a second fluid known in the art, such as air, may be used with the present invention. In addition, the fluid flow indicated by arrows 96 may be increased in speed by any conventional means 104 for increasing the speed of fluid flow known to the art. Similarly, a conventional means 106 is provided for causing a first fluid to flow in the tube 90 as indicated by the arrow 108.

Although the present invention has been described with specific detail and illustrated to show a particular embodiment of the present invention, it should be understood that alternative embodiments are to be considered within the scope of the present invention.

What I claim is:

1. A finned tube heat exchanger, comprising:
a tube shaped to contain and direct the flow of a first fluid;
a plurality of fins attached in thermal communication with said tube, each of said fins having a plurality of holes extending through the thickness thereof;
means for causing a substantial portion of a second fluid to pass through said holes;
and for directing said substantial portion of a second fluid away from a first one of said fins and toward a surface of a second one of said fins after passing through said plurality of holes in said first fin, said holes being shaped to form counter rotating vortices in the flow of said second fluid.

2. The heat exchanger of claim 1, wherein:
each said hole is generally oblong in shape with two ends and two long sides, a first one of said two long sides being generally flat and a second one of said two long sides having a cusp surface.

3. A heat exchanger, comprising:
a tube for containing a first fluid;
a plurality of fins connected in thermal communication with said tube, each of said fins having a plurality of holes extending therethrough;
means associated with said fins for forming target areas; and
means for causing a second fluid to pass through said holes and for directing said second fluid toward said target areas, said holes being generally elliptical in shape with two ends and two long sides, one long side being generally flat and the other long side having a cusp surface.

4. The heat exchange of claim 3, wherein:
said holes are shaped to form counter rotating vortices in the flow of said second fluid.

5. A heat exchanger, comprising:
a tube shaped to contain and direct a flow of a first fluid;
a plurality of plates attached to said tube and disposed in thermal communication with said tube, each of said plurality of plates having a plurality of holes extending through the thickness thereof;
said plurality of plates being associated with each other to form one or more channels for directing a substantial portion of a second fluid to pass through said holes, each of said holes being disposed proximate an adjacent plate to direct a stream of said second fluid toward said adjacent plate after passing through said hole which is so disposed; and
each of said holes being generally oblong in shape, having two ends and two long sides, a first long side being generally smooth and a second long side having a cusp surface.

6. The heat exchanger of claim 5, wherein:
said cusp surface effectively divides said hole into two generally circular lobes, said lobes being separated by said cusp surface across a portion of the distance between said two long sides and in fluid communication with each other across a portion of the distance between said two long sides.

7. The heat exchanger of claim 5, wherein:
each of said plurality of holes is shaped to create a pair of counter rotating vortices in said stream of said second fluid as it passes through said holes.

8. A heat exchanger, comprising:
first means for directing a first fluid to flow along a first predefined path;
second means for directing a second fluid to flow along a second predefined path;
means, associated with said second directing means, for causing said second fluid to form streams comprising pairs of counter rotating vortices; and
for directing said streams to flow away from said second directing means and against preselected surfaces of heat exchanger plates.

9. The heat exchanger of claim 8, wherein:
said causing means comprises a cusp surface of a generally oblong hole formed through said second directing means.

10. The heat exchanger of claim 8, wherein:
said first directing means is a tube.

11. The heat exchanger of claim 8, wherein:
said second directing means comprises a plurality of surfaces associated together to form one or more channels for directing a substantial portion of said second fluid into fluid communication with said causing means.

12. The heat exchanger of claim 8, wherein:
said causing means comprises a plurality of generally oblong holes, each of said holes having two ends and two long sides, one of said long sides having a cusp surface.

13. The heat exchanger of claim 8, wherein:
said heat exchanger is disposed in a furnace.

14. A method of exchanging heat between first and second fluids, comprising:
   directing a first fluid to flow along a first predefined path;
   directing a second fluid to flow along a second predefined path;
   directing said second fluid to form streams comprising pairs of counter rotating vortices, said streams flowing transverse said second predefined path; and
   directing said first fluid and said streams to flow against preselected surfaces of heat exchanger plates.

15. A heat exchanger, comprising:
   first means for directing a fluid to flow along a predefined path;
   second means for directing said fluid to form streams of flow comprising counter rotating vortices; and
   third means for directing said fluid to impinge against a heat exchanging surface.

16. The heat exchanger of claim 1, wherein an edge of each fin is connected to an edge of an adjacent fin.

17. A finned tube heat exchanger comprising:
   a tube shaped to contain and direct the flow of a first fluid;
   a plurality of substantially parallel fins attached in thermal communication with said tube, each of said fins having a plurality of holes extending through the thickness thereof, the holes being coplanar with the fins;
   said holes being shaped to form counter rotating vortices in a second fluid flowing substantially parallel to said fins and to direct said counter-rotating vortices to strike a surface of an adjacent fin at an angle transverse to the surface of the adjacent fin.

18. The heat exchanger of claim 17 wherein:
each of said holes are generally oblong in shape with two ends and two long sides, one of said long sides having a cusp surface.

19. The heat exchanger of claim 18 further comprising:
   means for causing a substantial portion of said second fluid to pass through said holes.

* * * * *